United States Patent
Lan et al.

(10) Patent No.: US 11,403,061 B2
(45) Date of Patent: Aug. 2, 2022

(54) AUDIO PROCESSING SYSTEM AND METHOD

(71) Applicant: C-MEDIA ELECTRONICS INC., Taipei (TW)

(72) Inventors: Po-Shu Lan, New Taipei (TW); Chun-Hung Kuo, Taipei (TW)

(73) Assignee: C-MEDIA ELECTRONICS INC., Taipei (TW)

( * ) Notice: Subject to any disclaimer, the term of this patent is extended or adjusted under 35 U.S.C. 154(b) by 334 days.

(21) Appl. No.: 16/846,421

(22) Filed: Apr. 13, 2020

(65) Prior Publication Data

US 2021/0048974 A1   Feb. 18, 2021

(30) Foreign Application Priority Data

Aug. 12, 2019   (TW) .................... 108128537

(51) Int. Cl.
| | |
|---|---|
| *G06F 3/16* | (2006.01) |
| *H05B 45/32* | (2020.01) |
| *H05B 47/10* | (2020.01) |
| *H05B 47/105* | (2020.01) |
| *H05B 45/325* | (2020.01) |

(52) U.S. Cl.
CPC ........... *G06F 3/162* (2013.01); *H05B 45/325* (2020.01); *H05B 47/105* (2020.01)

(58) Field of Classification Search
CPC ... G06F 3/14; G06F 3/16; G06F 3/162; H05B 45/32; H05B 45/325; H05B 47/10; H05B 47/105
See application file for complete search history.

(56) References Cited

U.S. PATENT DOCUMENTS

| | | | |
|---|---|---|---|
| 10,635,383 B2* | 4/2020 | Mäkinen | G06F 3/0488 |
| 2006/0171419 A1 | 8/2006 | Spindola et al. | |
| 2007/0177620 A1 | 8/2007 | Ohmuro et al. | |
| 2011/0081024 A1* | 4/2011 | Soulodre | H04S 7/30 |
| | | | 381/17 |
| 2017/0019734 A1 | 1/2017 | Zurek et al. | |

* cited by examiner

*Primary Examiner* — Jimmy T Vu
(74) *Attorney, Agent, or Firm* — Li & Cai Intellectual Property Office (57) ABSTRACT

An audio processing system and a method thereof are provided. The system includes an audio receiver and an audio processor device. The audio receiver includes an audio interface, an absolute value converter unit, a framing unit and a characteristic value detector unit. The audio interface receives an audio signal from an audio transceiver device. The absolute value converter unit takes an absolute value of the audio signal to output an absolute value audio signal. The framing unit divides the absolute value audio signal into a plurality of sub-frame signals. The characteristic value detector unit detects characteristic values of the sub-frame signals. The audio processer processes the audio signal outputted by the audio transceiver device according to the characteristic values of the sub-frame signals.

20 Claims, 9 Drawing Sheets

AUDIO PROCESSING SYSTEM AND METHOD

CROSS-REFERENCE TO RELATED PATENT APPLICATION

This application claims the benefit of priority to Taiwan Patent Application No. 108128537, filed on Aug. 12, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an audio processing system and a method thereof, and more particularly to an audio processing system and a method thereof for improving an operational performance of an audio processing device.

BACKGROUND OF THE DISCLOSURE

A common audio processing system obtains an audio signal or environmental noise from an audio transceiver such as a sensor or a microphone. A special algorithm program is executed on the audio signal by a hardware or digital signal processor (DSP) to implement an automatic gain control, a noise gate and a smart volume control. Alternatively, the common audio processing system monitors and plays the audio signal, and dynamically adjusts a light-emitting device according to a content of the audio signal to realize better sound and light effects. However, the common algorithm program must be executed by a dedicated hardware or the digital signal processor, resulting in a low processing efficiency and cost effectiveness.

SUMMARY OF THE DISCLOSURE

In response to the above-referenced technical inadequacies, the present disclosure provides an audio processing system, which is applicable to one or more audio transceiver devices. The audio processing system includes one or more audio receivers and an audio processor device. The audio receiver includes an audio interface, an absolute value converter unit, a framing unit and a characteristic value detector unit. The audio interface is connected to the one or more audio transceiver devices and configured to receive an audio signal from the audio transceiver device. The absolute value converter unit is connected to the audio interface and configured to take an absolute value of the audio signal to output an absolute value audio signal. The framing unit is connected to the absolute value converter unit and configured to divide the absolute value audio signal into a plurality of sub-frame signals. The characteristic value detector unit is connected to the framing unit and configured to detect one or more characteristic values of the sub-frame signal. The audio processer device is connected to the audio receiver and the audio transceiver device and configured to output an audio processing signal to process the audio signal according to the one or more characteristic values of the sub-frame signals of the audio transceiver device.

In certain embodiments, the characteristic value detector unit includes a peak value detector unit, which is connected to the framing unit and configured to detect a peak value of the sub-frame signal, and the characteristic value includes the peak value.

In certain embodiments, the characteristic value detector unit includes an average value calculator unit, which is connected to the framing unit and configured to calculate an average value of the sub-frame signal, and the characteristic value includes the average value.

In certain embodiments, the characteristic value detector unit includes an envelope filter unit, which is connected to the framing unit and configured to filter the sub-frame signal.

In certain embodiments, the framing unit divides the absolute value audio signal into the plurality of sub-frame signals having variable lengths.

In certain embodiments, the audio processing system further includes a light driver module, which is connected to the audio processer device and one or more light-emitting modules. The audio processer device is configured to output a light controlling signal to control the light driver module to drive the light-emitting module matched with the audio transceiver device to output a light signal according to the one or more characteristic values.

In certain embodiments, the light driver module includes a pulse width modulation signal generator unit. The pulse width modulation signal generator unit is connected to the one or more light-emitting modules. The pulse width modulation signal generator unit is configured to output a pulse width modulation signal to control the light-emitting module matched with the audio transceiver device to output a light signal according to the one or more characteristic values. The light controlling signal includes the pulse width modulation signal.

In certain embodiments, when the audio processer device determines the characteristic value of the sub-frame signal to be smaller than a threshold and a time during which the characteristic value to be smaller than the threshold is larger than a hold time, the audio processer device outputs the audio processing signal to lower the characteristic value of the audio signal outputted by the audio transceiver device to be equal to a mute threshold within a release time.

In certain embodiments, when the audio processer device determines the characteristic value of the sub-frame signal to be larger than a threshold, the audio processer device outputs the audio processing signal to increase the characteristic value of the audio signal outputted by the audio transceiver device within an attack time.

In certain embodiments, the audio processing system further includes a digital volume controller, a gain of which is adjusted by the audio processer device to eliminate noise of the audio signal when the audio processer device determines that the audio signal has the noise according to the one or more characteristic values of the sub-frame signal.

In addition, the present disclosure provides an audio processing method, which is applicable to one or more audio transceiver devices. The audio processing method includes the following steps: receiving an audio signal from the audio transceiver device by an audio interface of an audio receiver; taking an absolute value of the audio signal to output an absolute value audio signal by an absolute value converter unit of the audio receiver; dividing the absolute value audio signal into a plurality of sub-frame signals by a framing unit of the audio receiver; detecting one or more characteristic values of the sub-frame signal by a characteristic value detector unit of the audio receiver; and outputting an audio processing signal to process the audio signal according to the one or more characteristic values of the sub-frame signals by an audio processer device.

In certain embodiments, the step of detecting the one or more characteristic values of the sub-frame signal by the characteristic value detector unit of the audio receiver includes: detecting a peak value of the sub-frame signal by a peak value detector unit of the characteristic value detector unit.

In certain embodiments, the step of detecting the one or more characteristic values of the sub-frame signal by the characteristic value detector unit of the audio receiver includes: detecting an average value of the sub-frame signal by an average value calculator unit of the characteristic value detector unit.

In certain embodiments, the step of detecting the one or more characteristic values of the sub-frame signal by the characteristic value detector unit of the audio receiver includes: filtering the sub-frame signal by an envelope filter unit of the characteristic value detector unit.

In certain embodiments, the step of dividing the absolute value audio signal into the plurality of sub-frame signals by the framing unit includes: dividing the absolute value audio signal into the plurality of sub-frame signals having variable lengths.

In certain embodiments, the audio processing method further includes the following step: outputting a light controlling signal to control a light driver module to drive a light-emitting module to output a light signal according to the one or more characteristic values of the sub-frame signal of the audio transceiver device by the audio processer device.

In certain embodiments, the audio processing method further includes the following step: outputting a pulse width modulation signal to control a light-emitting module to output a light signal according to the one or more characteristic values by a pulse width modulation signal generator unit.

In certain embodiments, the audio processing method further includes the following step: outputting, by the audio processer device, the audio processing signal to lower the characteristic value of the audio signal outputted by the audio transceiver device to be equal to a mute threshold within a release time, when determining the characteristic value of the sub-frame signal to be smaller than a threshold and a time during which the characteristic value to be smaller than the threshold is larger than a hold time.

In certain embodiments, the audio processing method further includes the following step: outputting, by the audio processer device, the audio processing signal to increase the characteristic value of the audio signal outputted by the audio transceiver device within an attack time, when determining the characteristic value of the sub-frame signal to be larger than a threshold.

In certain embodiments, the audio processing method further includes the following step: adjusting, by the audio processer device, a gain of a digital volume controller to eliminate noise of the audio signal, when determining that the audio signal has the noise according to the one or more characteristic values of the sub-frame signal.

Therefore, the present disclosure provides the audio processing system and method. The system may receive the audio signal from any signal source, take the absolute value of the audio signal, divide the audio signal into the plurality of sub-frame signals, filter the sub-frame signals, detect the peak values and the average values of the sub-frame signals, and provide them to the audio processer device as control parameters for controlling the audio transceiver device. Therefore, a performance of the audio processing device can be effectively improved via this single simplified circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
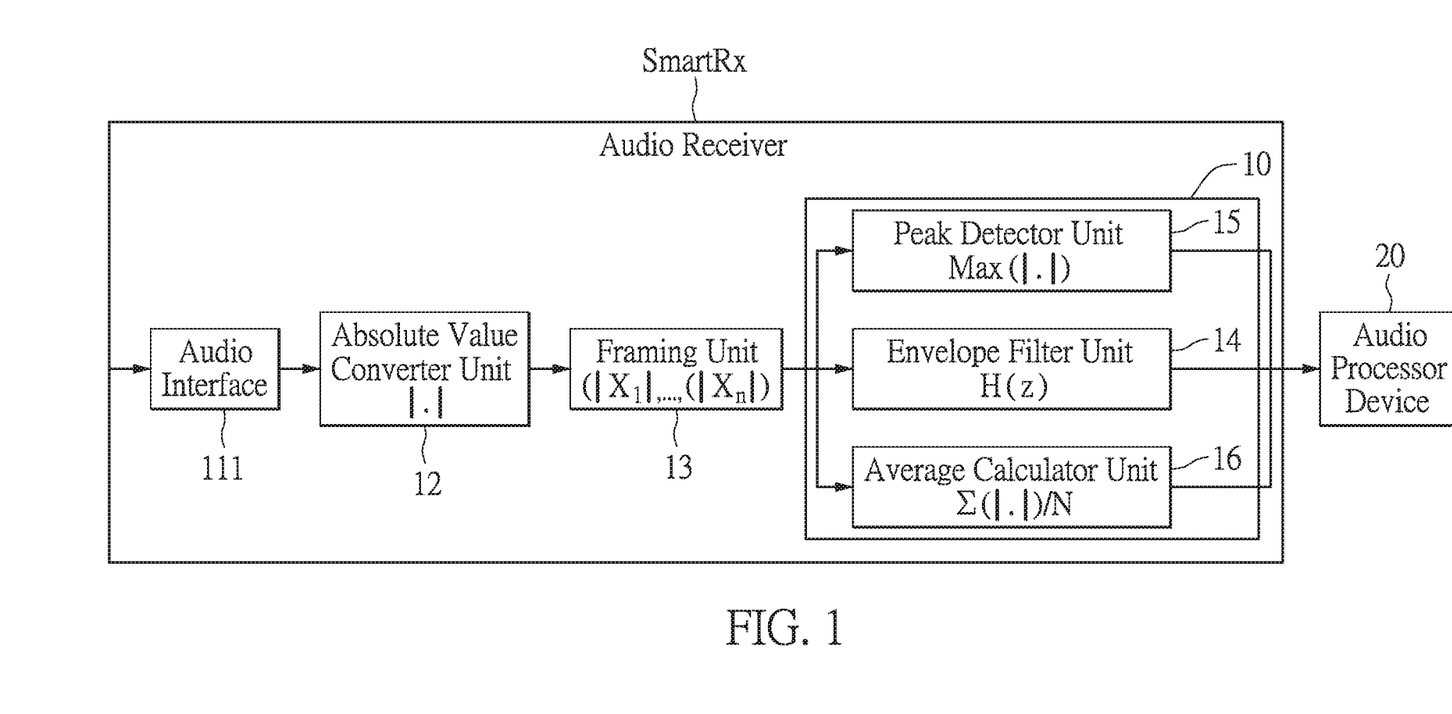
FIG. 1 is a block diagram of an audio receiver of an audio processing system according to an embodiment of the present disclosure.
Figure 2:
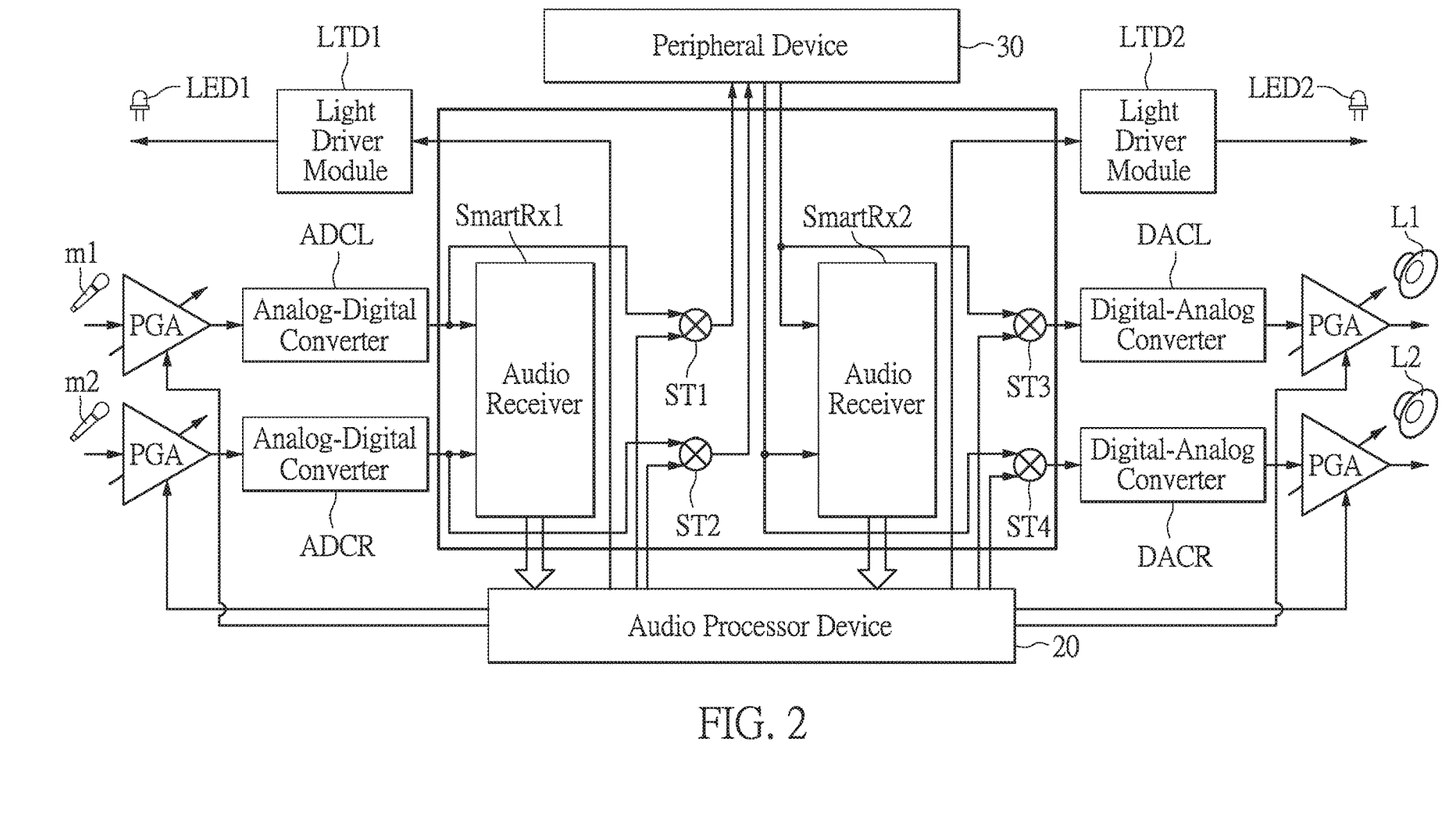
FIG. 2 is a schematic diagram of a configuration of the audio processing system, audio transceiver devices, light-emitting modules, light driver modules, analog-digital converters, an audio processer device, digital-analog converters and a peripheral device according to the embodiment of the present disclosure.
Figure 6:
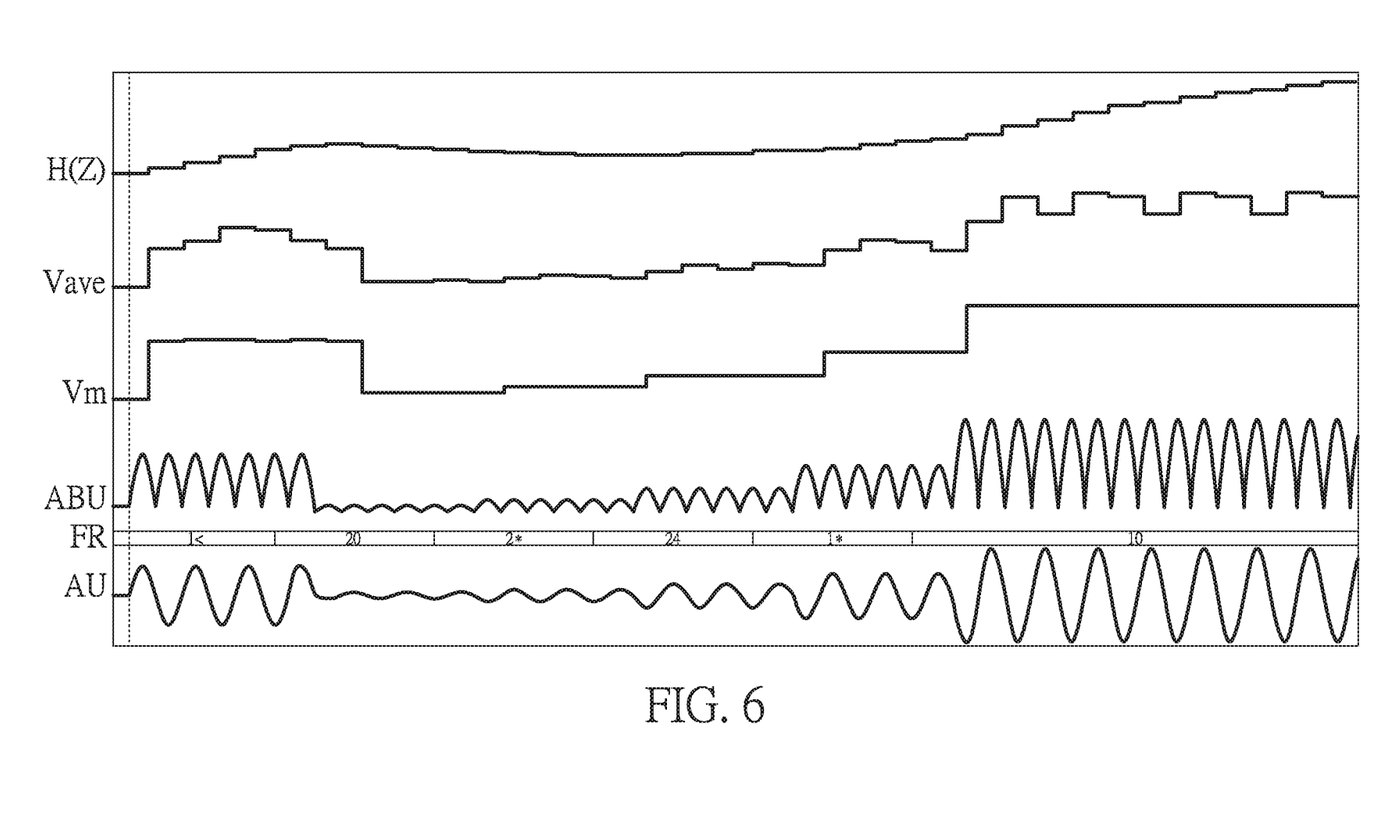
FIG. 6 is a waveform diagram of a sub-frame filtering signal, an average value signal, a peak value signal, an absolute value audio signal, the sub-frame signal and the audio signal to be provided to the audio processer device by the audio processing system and method based on lengths of the sub-frame signal according to the embodiment of the present disclosure.

Reference is made to FIGS. 1, 2 and 6, wherein FIG. 1 is a block diagram of an audio receiver of an audio processing system, FIG. 2 is a schematic diagram of a configuration of the audio processing system, audio transceiver devices, light-emitting modules, light driver modules, analog-digital converters, an audio processer device, digital-analog converters and a peripheral device, and FIG. 6 is a waveform diagram of a sub-frame filtering signal, an average value signal, a peak value signal, an absolute value audio signal, the sub-frame signal and the audio signal to be provided to the audio processer device by the audio processing system and method based on lengths of the sub-frame signal, according to an embodiment of the present disclosure.

It is worth noting that the audio processing system of the embodiment of the present disclosure mainly includes an audio receiver SmartRx as shown in FIG. 1. The audio receiver SmartRx may include an audio receiver SmartRx1 and an audio receiver SmartRx2 as shown in FIG. 2. For convenience of description, in the embodiment, two audio receivers SmartRx1 and SmartRx2 are exemplified to perform operations such as detecting and processing operations of audio signals from different sources. It should be understood that the present disclosure is limited to the two audio receivers SmartRx1 and SmartRx2 to perform the operations. In practice, they may be replaced by a single audio receiver or any number of audio receivers to perform operations such as detecting and processing operations of audio signals from different sources.

Each of the audio receivers SmartRx1 and SmartRx2 as shown in FIG. 2 may include an audio interface 111, an absolute value converter unit 12, a framing unit 13 and a characteristic value detector unit 10 as shown in FIG. 1.

In the embodiment, the characteristic value detector unit 10 may include an envelope filter unit 14, a peak value detector unit 15 and an average value calculator unit 16, but the present disclosure is not limited thereto. The envelope filter unit 14 is configured to filter the audio signal. The peak value detector unit 15 is configured to detect a peak value of the audio signal. The average value calculator unit 16 is configured to calculate an average value of the audio signal. In practice, the characteristic value detector unit 10 may calculate other characteristic values of the audio signal.

The audio interface 111 is connected to the absolute value converter unit 12. The absolute value converter unit 12 is connected to the framing unit 13. The framing unit 13 is connected to the characteristic value detector unit 10.

As shown in FIG. 2, the audio transceiver device may include a microphone m1, a microphone m2, a speaker L1, a speaker L2, or other devices for playing or providing audio signals, but the present disclosure is not limited thereto.

As shown in FIGS. 1 and 2, an analog-digital converter ADCL may be disposed between the audio interface 111 of the audio receiver SmartRx1 and a programmable gain amplifier PGA of the microphone m1. The programmable gain amplifier PGA of the microphone m1 multiplies a parameter value of the audio signal of the microphone m1 by a programmable gain, and then outputs the audio signal to the analog-digital converter ADCL.

The analog-digital converter ADCL may receive the amplified audio signal that is an analog audio signal from the programmable gain amplifier PGA of the microphone m1, and convert the audio signal to a digital format to be outputted to the audio receiver SmartRx1.

Similarly, a digital-analog converter ADCR may be disposed between the audio interface 111 of the audio receiver SmartRx1 and a programmable gain amplifier PGA of the microphone m2 The programmable gain amplifier PGA of the microphone m2 multiplies a parameter value of an audio signal of the microphone m2 by a programmable gain, and outputs an amplified audio signal to an analog-digital converter ADCR.

The analog-digital converter ADCR may receive the amplified audio signal that is an analog audio signal from the programmable gain amplifier PGA of the microphone m2, and convert the audio signal to a digital format to be outputted to the audio receiver SmartRx1.

However, if a format of the digital audio signal does not conform to a signal format that can be processed by the audio receiver SmartRx1, the audio interface 111 may convert the format of the audio signal. Further, as shown in FIG. 1, the audio interface 111 of the audio receiver SmartRx1 outputs the audio signal to the absolute value converter unit 12. The absolute value converter unit 12 is configured to take an absolute value of the audio signal to output an absolute value audio signal. As shown in FIG. 6, before the absolute value of the audio signal AU is taken, the audio signal AU has a positive half wave and a negative half wave. An absolute value audio signal ABU generated by taking the absolute value of the audio signal AU has only the positive half wave.

The framing unit 13 is configured to divide the absolute value audio signal ABU outputted by the absolute value converter unit 12 into a plurality of sub-frame signals FR shown in FIG. 6. The number and lengths of the sub-frame signals FR may be individually adjusted according to actual requirements. For example, the lengths of the sub-frame signals FR may be the same or different from each other.

After the absolute value audio signal ABU is divided into the sub-frame signals FR, the envelope filter unit 14, the peak value detector unit 15 and the average value calculator unit 16 of the audio receiver SmartRx1 process or detect the sub-frame signals FR.

For example, the envelope filter unit 14 may filter each of the sub-frame signals FR to output a filtered sub-frame signal according to a filtering parameter matrix H(Z) shown in FIG. 1 and FIG. 6. The peak value detector unit 15 may detect a peak value of each of waveforms of the sub-frame signal FR to obtain a peak value signal Vm shown in FIG. 6. The average value calculator unit 16 may detect an average value of each of the waveforms of the sub-frame signal FR to obtain an average value signal Vave shown in FIG. 6.

Further, as shown in FIG. 1, the audio receiver SmartRx1 may output the sub-frame signals FR, the filtered sub-frame signals, and the detected and calculated peak and average values to an audio processor device 20.

As shown in FIG. 2, a digital volume controller ST1 is connected to the audio processor device 20, the analog-digital converter ADCL and a peripheral device 30. The audio processor device 20 obtains the characteristic values of the sub-frame signals FR detected by the audio receiver SmartRx1 and determines whether or not the audio signal AU from the analog-digital converter ADCL has noise according to the characteristic values. If the audio signal AU has the noise, a gain of the digital volume controller ST1 is adjusted to eliminate the noise of the audio signal AU to be provided to the peripheral device 30.

Similarly, a digital volume controller ST2 is connected to the audio processor device 20, the analog-digital converter ADCR and the peripheral device 30. The audio processor device 20 obtains the characteristic values of the sub-frame signals FR detected by the audio receiver SmartRx1 and determines whether or not the audio signal AU from the analog-digital converter ADCR has noise according to the characteristic values. If the audio signal AU has the noise, a gain of the digital volume controller ST2 is adjusted to eliminate the noise of the audio signal AU to be provided to the peripheral device 30.

For example, the audio processor device 20 may be a microcontroller (MCU) or a digital signal processor (DSP), and the peripheral device 30 may include a device having a USB and an I2S, but the present disclosure is not limited thereto.

The audio processor device 20 may be connected to the audio receiver SmartRx1 and the audio transceiver devices such as the microphones m1 and m2 The audio processor device 20 is configured to output an audio processing signal to process the audio signal AU outputted by the audio transceiver device according to the characteristic values.

For example, the audio processor device 20 may directly adjust or instruct the programmable gain amplifier PGA of the audio transceiver device to select or set the peak value, an amplitude, the average value, a frequency, a period or other waveform parameters of the audio signal AU from the audio processor device 20.

A light driver module LTD1 is connected to the audio processor device 20 and a light-emitting module LED1. The audio processor device 20 may be configured to control the light driver module LTD1 to drive the light-emitting module LED1 to output a light signal corresponding to the characteristic values of the sub-frame signals of the microphone m1.

Similarly, the audio receiver SmartRx2 may detect the characteristic values of the sub-frame signals FR provided by the peripheral device 30. The audio processor device 20 may be configured to control a light driver module LTD2 to drive a light-emitting module LED2 to output a light signal corresponding to the characteristic values of the sub-frame signals of the microphone m2.

The light driver modules LTD1 and LTD2 may respectively drive the light-emitting modules LED1 and LED2 in various ways. For example, the light driver module LTD1 may include a pulse width modulation signal generator unit connected to the light-emitting module LED1. The light driver module LTD2 may include a pulse width modulation signal generator unit connected to the light-emitting module LED2. The pulse width modulation signal generator unit of the light driver module LTD1 is configured to output a pulse width modulation signal PWM to control the light-emitting module LED1 to output a light signal, according to the characteristic values of the sub-frame signals of the microphone m1 matched with the light-emitting module LED1. The pulse width modulation signal generator unit of the light driver module LTD2 is configured to output a pulse width modulation signal PWM to control the light-emitting module LED2 to output a light signal, according to the characteristic values of the sub-frame signals of the microphone m2 matched with the light-emitting module LED2.

It should be understood that amplitudes, frequencies, periods, light intensities, colors and other parameters of waveforms of the light signals outputted by the light-emitting modules LED1 and LED2 may be changed with the characteristic values of the sub-frame signals FR.

The peripheral device 30 may provide the audio signals to digital volume controllers ST3 and ST4. The audio processor device 20 obtains the characteristic values of the sub-frame signals FR detected by the audio receiver SmartRx2 and determines whether or not the audio signals AU from the peripheral device 30 have noises according to the characteristic values. If the audio signals AU have the noises, gains of the digital volume controllers ST3 and ST4 are adjusted to eliminate the noises of the audio signals AU to be provided to digital-analog converters DACL and DACR.

If the speaker L1 or L2 cannot play a digital audio signal indicated by the audio processing signal, the digital-analog converter DACL or DACR may convert the digital audio signal into an analog audio signal to be outputted to the speaker L1 or L2. The speaker L1 or L2 plays the analog audio signal.

Figure 3:
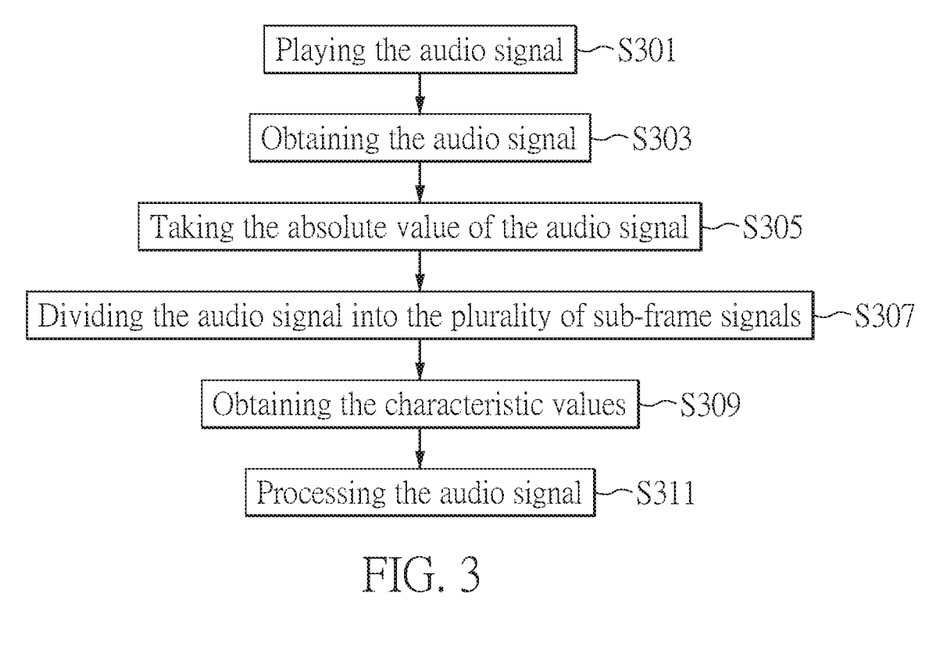
FIG. 3 is a flowchart diagram of steps of taking an absolute value of an audio signal, dividing the audio signal, detecting characteristic values of sub-frame signals and processing the audio signal in an audio processing method according to the embodiment of the present disclosure.

Reference is further made to FIG. 3, which is a flowchart diagram of steps of taking an absolute value of an audio signal, dividing the audio signal, detecting characteristic values of sub-frame signals and processing the audio signal in an audio processing method according to the embodiment of the present disclosure. As shown in FIG. 3, in the embodiment of the present disclosure, the audio processing method includes steps S301 to S311 for the above-mentioned audio processing system.

For convenience of description, in the embodiment, two audio receivers SmartRx1 and SmartRx2 are exemplified to perform operations such as detecting and processing operations of audio signals from different sources. It should be understood that the present disclosure is limited to the two audio receivers SmartRx1 and SmartRx2 to perform the operations. In practice, they can be replaced by a single audio receiver or any number of audio receivers to perform operations such as detecting and processing operations of audio signals from different sources.

In step S301, the audio transceiver devices such as the microphones m1 and m2 as shown in FIG. 2 play the audio signals.

In step S303, the audio interface 111 of the audio receiver SmartRx1 obtains the audio signal from the microphone m1 or m2 In addition, the audio interface 111 of the audio receiver SmartRx2 obtains the audio signal from the peripheral device 30.

In step S305, the absolute value converter units 12 of the audio receivers SmartRx1 and SmartRx2 take the absolute values of the audio signals to output the absolute value audio signals.

In step S307, the framing units 13 of the audio receivers SmartRx1 and SmartRx2 divide each of the absolute value audio signals into the plurality of sub-frame signals.

In step S309, the characteristic value detector units 10 of the audio receivers SmartRx1 and SmartRx2 detect or calculate the characteristic values of the sub-frame signals. For example, the envelope filter units 14 of the audio receivers SmartRx1 and SmartRx2 filter the sub-frame signals. In another example, the peak value detector units 15 of the audio receivers SmartRx1 and SmartRx2 detect the peak values of the sub-frame signals. In another example, the average value calculator units 16 of the audio receivers SmartRx1 and SmartRx2 calculate the average values of the sub-frame signals.

In step S311, the audio processor device 20 outputs the audio processing signal to process the audio signals outputted by the audio transceiver devices according to the characteristic values of the sub-frame signals.

Figure 4:
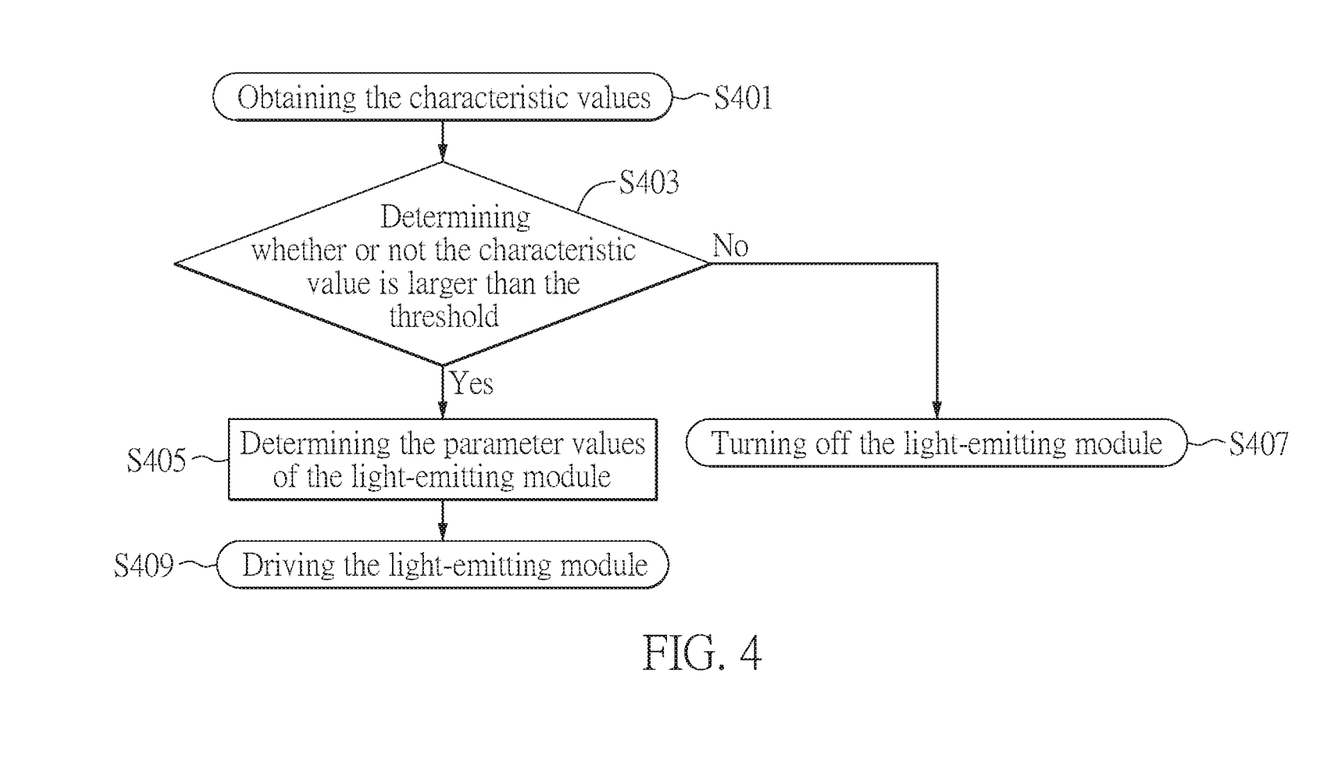
FIG. 4 is a flowchart diagram of a step of adjusting an emission state of the light-emitting module according to the characteristic values of sub-frame signals in the audio processing method according to the embodiment of the present disclosure.

Reference is further made to FIG. 4, which is a flowchart diagram of a step of adjusting an emission state of the light-emitting module according to the characteristic values of sub-frame signals in the audio processing method according to the embodiment of the present disclosure. As shown in FIG. 4, in the embodiment of the present disclosure, the audio processing method includes steps S401 to S409 for the above-mentioned audio processing system.

For convenience of description, in the embodiment, two audio receivers SmartRx1 and SmartRx2 are exemplified to perform operations such as detecting and processing operations of audio signals from different sources. It should be understood that the present disclosure is limited to the two audio receivers SmartRx1 and SmartRx2 to perform the operations. In practice, they may be replaced by a single audio receiver or any number of audio receivers to perform operations such as detecting and processing operations of audio signals from different sources.

In step S401, the audio receiver SmartRx1 obtains the characteristic values of the audio signals AU of the microphones m1 and m2 The audio receiver SmartRx2 obtains the characteristic values of the audio signals AU provided through the peripheral device 30.

In step S403, the audio processor device 20 determines whether or not the characteristic value of the sub-frame signal is larger than a threshold, for example, the average value is larger than an average threshold, the peak value is larger than a peak threshold, the amplitude is larger than an amplitude threshold, the frequency is larger than a frequency threshold, the period is larger than a period threshold, a length of the sub-frame signal is larger than a frame length threshold, and so on.

In step S405, the audio processor device 20 may determine parameter values of the light signal according to a determination result of the characteristic value of the sub-frame signal and the threshold value. For example, the larger the peak value of the sub-frame signal is, the larger a peak value of the light signal outputted by the light-emitting module is. That is, the louder the volume is, the higher the brightness is, but the present disclosure is not limited thereto.

In step S407, a mute threshold or a low volume threshold may be set. When one or more of the characteristic values of the sub-frame signals of the audio transceiver device such as the peak value are not larger than the threshold, it is determined that a volume of the audio transceiver device is too low. For example, the volume may be lower than is audible for human ears. The audio processor device 20 may control the light driver module LTD1 to turn off the light-emitting module LED1 to stop the light-emitting module LED1 to output the light signal for informing a user of the volume.

In step S409, when the one or more characteristic values of the sub-frame signals of the audio transceiver device are larger than the threshold, the parameter values of the light signal outputted by the light-emitting module LED1 may be determined and adjusted timely according to the characteristic values of the sub-frame signals.

Figure 5:
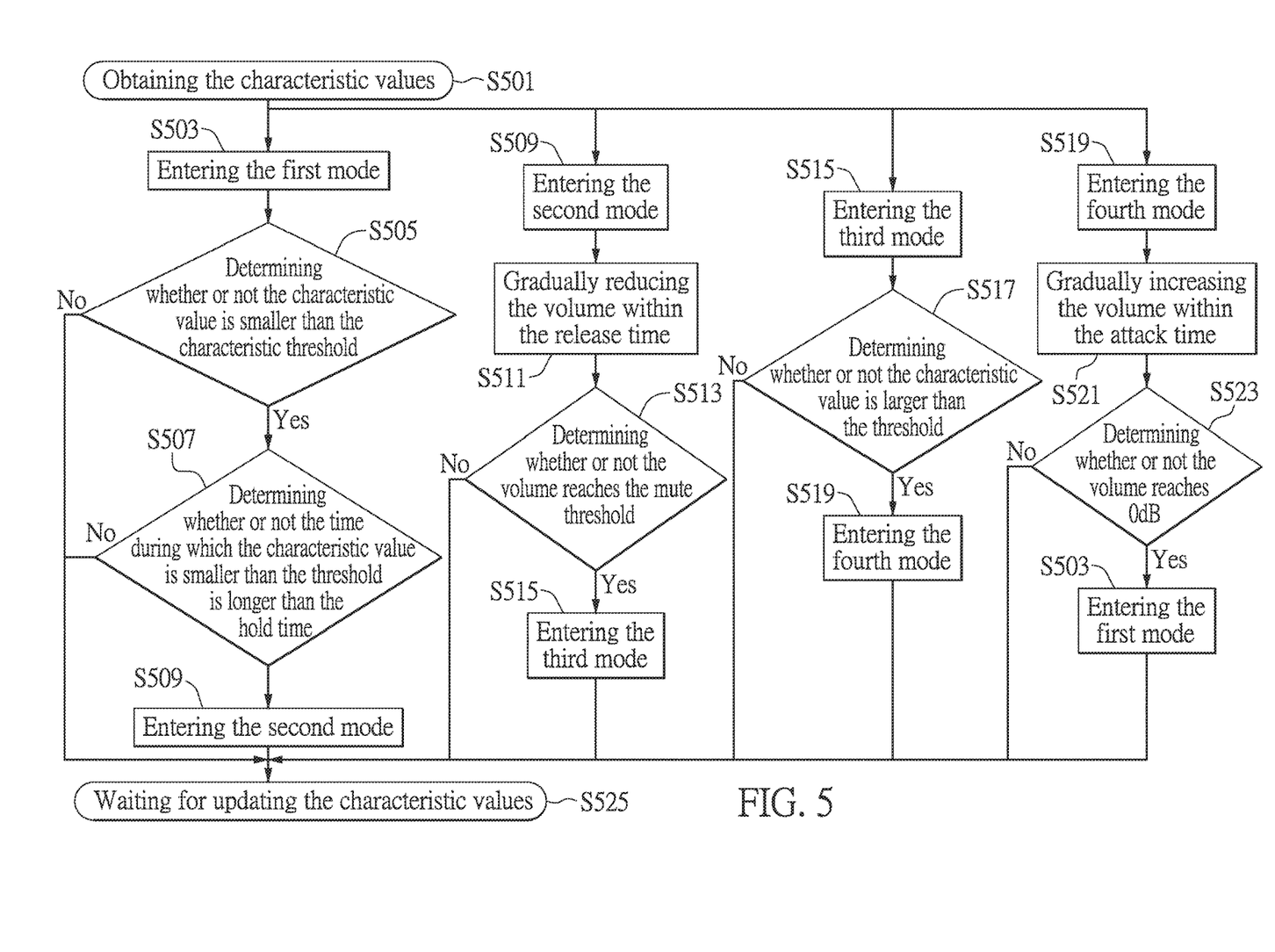
FIG. 5 is a flowchart diagram of a noise gate of the audio processing method according to the embodiment of the present disclosure.
Figure 9:
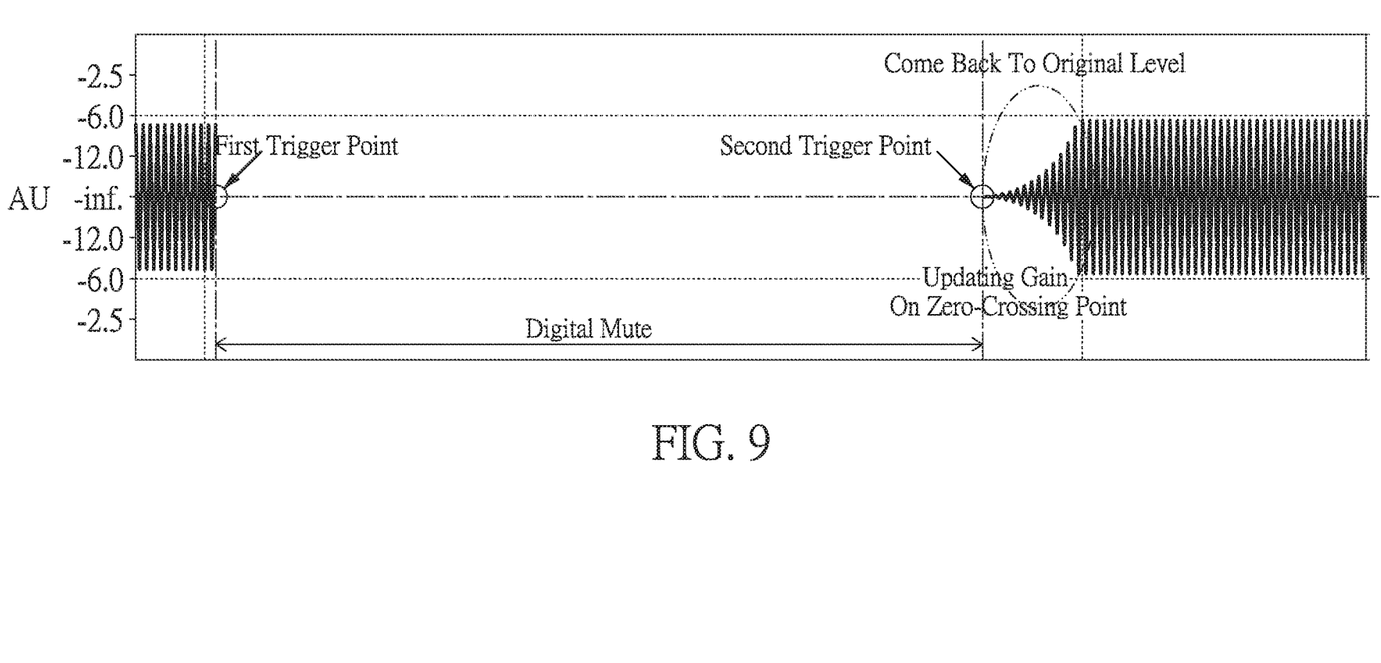
FIG. 9 is a waveform diagram of an output signal for implementing the noise gate by the audio processing system and method according to the embodiment of the present disclosure.
Figure 10:
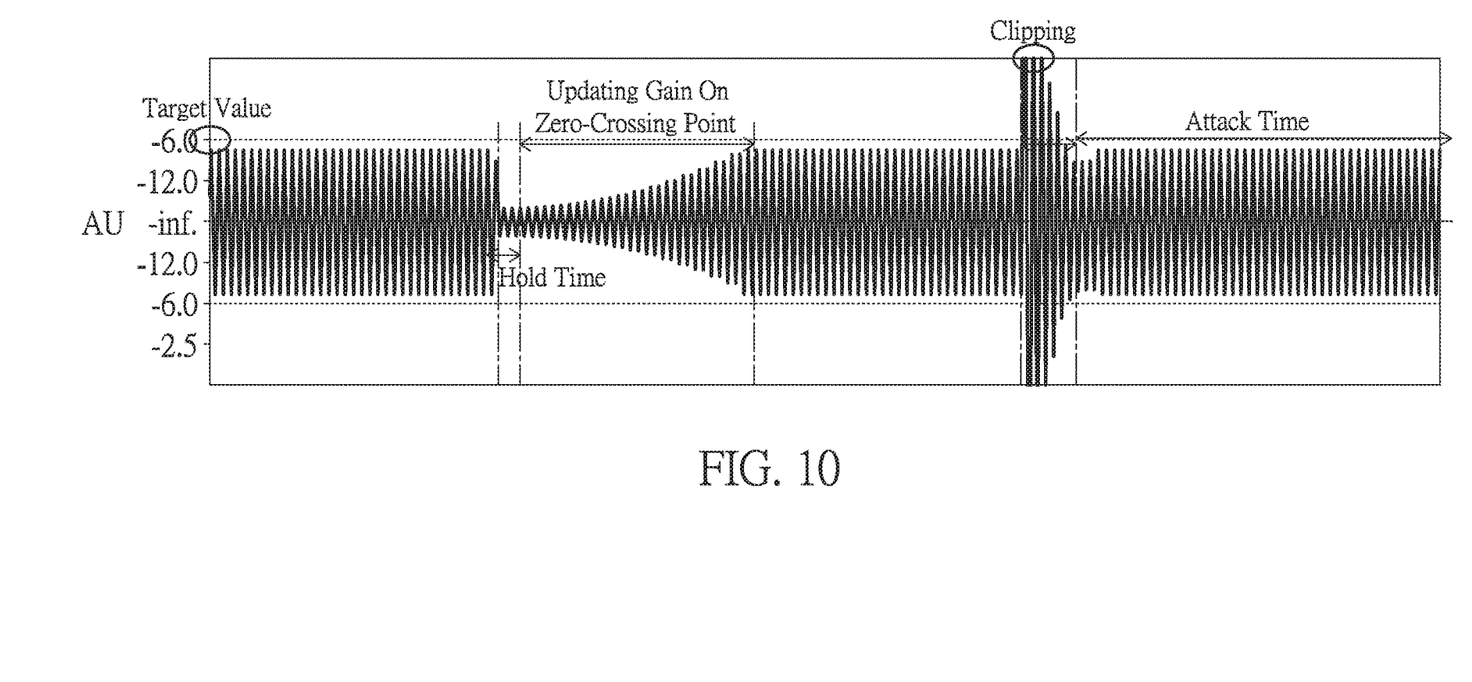
FIG. 10 is a waveform diagram of an output signal of an automatic gain control (AGC) implemented by the audio processing system and method according to the embodiment of the present disclosure.

Reference is made to FIGS. 5, 9 and 10, wherein FIG. 5 is a flowchart diagram of a noise gate of the audio processing method, FIG. 9 is a waveform diagram of an output signal for implementing the noise gate by the audio processing system and method, and FIG. 10 is a waveform diagram of an output signal of an automatic gain control (AGC) implemented by the audio processing system and method, according to the embodiment of the present disclosure. As shown in FIG. 5, in the embodiment of the present disclosure, the audio processing method includes the following steps S501 to S525.

In step S501, the audio receiver detects the characteristic values of the sub-frame signals.

In step S503, the audio processing system enters a first mode.

In step S505, the audio processor device obtains the characteristic values of the sub-frame signals that are detected or calculated by the audio receiver. For example, the audio processor device obtains the peak value of the volume of the sub-frame signal that is detected by the peak value detector unit, or the average value of the volume of the sub-frame signals that is calculated by the average value calculator unit. The audio processor device determines whether or not the volume of the sub-frame signal is smaller than a volume threshold according to the characteristic values of the sub-frame signals. If the volume of the sub-frame signal is not smaller than the volume threshold, the audio processor device does not adjust the characteristic values of the sub-frame signals to maintain the volume of the audio transceiver device and the emission state of the light-emitting module, and step S525 is concurrently performed. If the volume of the sub-frame signal is smaller than the volume threshold, step S507 is performed.

In step S507, the audio processor device determines whether or not a time during which the volume of the sub-frame signal is smaller than the volume threshold is larger than a hold time shown in FIG. 10. If the time is not larger than the hold time, the audio processor device does not adjust the characteristic values of the sub-frame signals to maintain the volume of the audio transceiver device and the emission state of the light-emitting module, and step S525 is concurrently performed. If the time is larger than the hold time, step S509 is performed.

In step S509, the audio processing system enters a second mode.

In step S511, the audio processor device controls the audio transceiver device to output the audio signal, the volume of which gradually reduces within a release time.

In step S513, the audio processor device determines whether or not the characteristic value of the sub-frame signal from the audio receiver reaches the mute threshold such as 0 dB. If the characteristic value reaches the mute threshold, the audio processor device does not adjust the characteristic values of the sub-frame signals to maintain the volume of the audio transceiver device and the emission state of the light-emitting module, and step S525 is concurrently performed. If the characteristic value reaches the mute threshold, as shown in FIG. 9, the audio signal AU enters a mute level from a first trigger point, and step S515 is performed.

In step S515, the audio processing system enters a third mode.

In step S517, the audio processor device determines whether or not the characteristic value of the sub-frame signal from the audio receiver reaches a threshold. If the characteristic value does not reach the threshold, the audio processor device does not adjust the characteristic values of the sub-frame signals to maintain the volume of the audio transceiver device and the emission state of the light-emitting module, and step S525 is concurrently performed. If the characteristic value reaches the threshold, step S519 is performed.

In step S519, the audio processing system enters a fourth mode.

In step S521, the gain of the zero-crossing point from the second triggering point shown in FIG. 9 is updated, and the volume of the audio signal AU returns to the original level. Then, as shown in FIG. 10, the audio transceiver device outputs the audio signal AU, the volume of which gradually increases within an attack time.

In step S523, the audio processor device determines whether or not the volume is reducing and how much the volume reduces to determine whether or not the characteristic value of the sub-frame signal reaches 0 dB, according to the characteristic value such as the peak value, the average value or the slope of the waveform of the sub-frame signal outputted by the audio receiver. If the characteristic value does not reach 0 dB, the audio processor device does not adjust the characteristic values of the sub-frame signals to maintain the volume of the sub-frame signal and the emission state of the light-emitting module, and step S525 is concurrently performed. If the characteristic value reaches 0 dB, step S503 is performed.

In step S525, the characteristic value of the audio signal is waiting to be updated.

Figure 7:
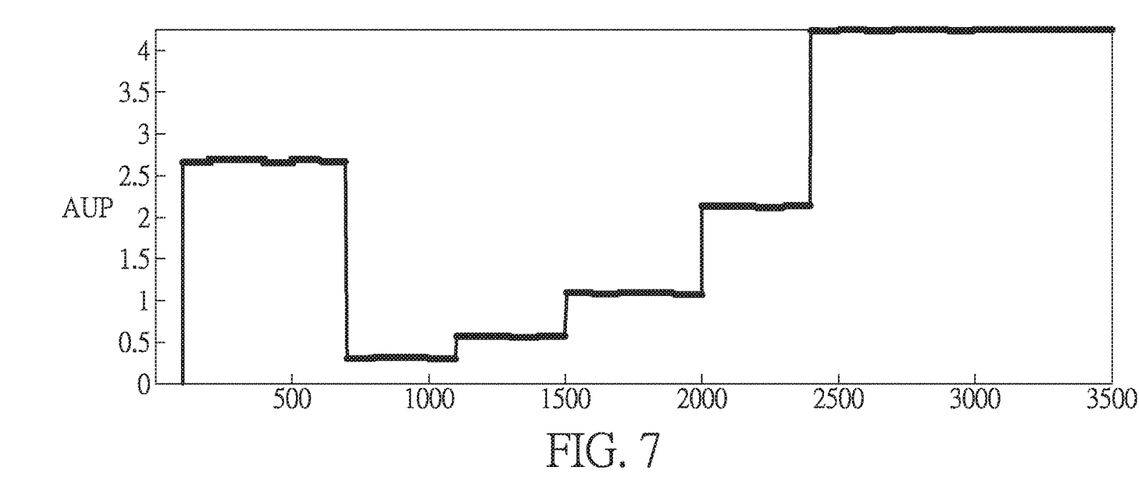
FIG. 7 is a waveform diagram of the average value signal that is provided to the audio processer device to dynamically control the light-emitting modules by the audio processing system and method according to the embodiment of the present disclosure.
Figure 8:
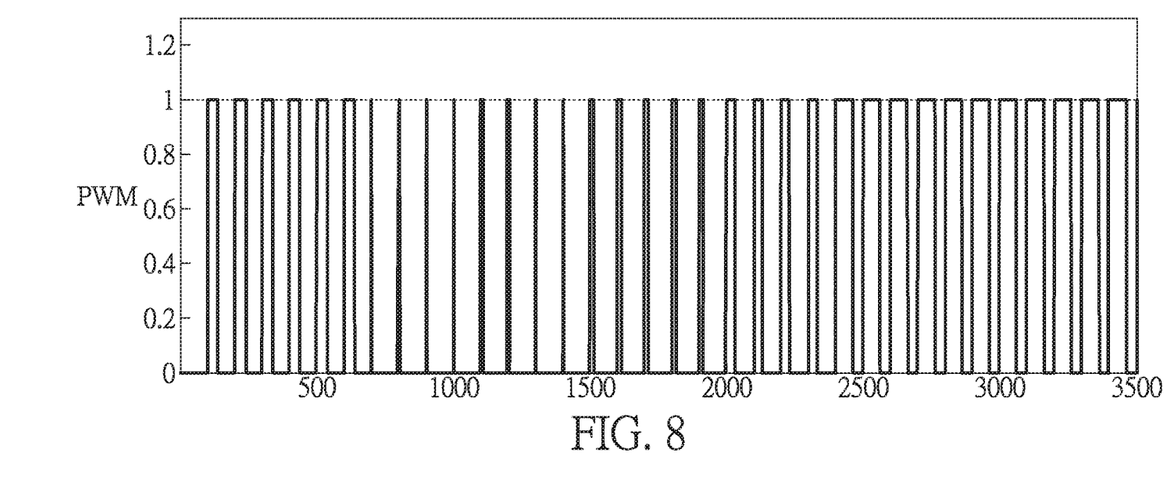
FIG. 8 is a waveform diagram of a pulse width modulation signal for controlling a brightness of the light-emitting module by the audio processing system and method according to the embodiment of the present disclosure.

Reference is made to FIGS. 7 and 8, wherein FIG. 7 is a waveform diagram of the average value signal that is provided to the audio processer device to dynamically control the light-emitting modules by the audio processing system and method, and FIG. 8 is a waveform diagram of a pulse width modulation signal for controlling a brightness of the light-emitting module by the audio processing system and method, according to the embodiment of the present disclosure.

In the embodiment of the present disclosure, the audio receiver SmartRx of the audio processing system and method as shown in FIG. 1 generates an average value signal AUP shown in FIG. 7. The audio receiver SmartRx includes the audio receiver SmartRx1 shown in FIG. 2. For example, the audio receiver SmartRx1 is configured to detect the average value of each of waveforms of the sub-frame signals divided from the audio signal outputted by the audio transceiver device such as the microphone m1 shown in FIG. 2 to generate the average value signal AUP shown in FIG. 7.

The audio receiver SmartRx1 outputs the average value signal AUP of the microphone m1 to the audio processor device 20. The audio processor device 20 outputs a light controlling signal to control the light driver module LTD1 to output the pulse width modulation signal PWM shown in FIG. 8 according to the average value signal AUP.

The light driver module LTD1 outputs the pulse width modulation signal PWM to drive the light-emitting module LED1 matched with the microphone m1 to output the light signal corresponding to the average value signal AUP. The larger the average value of the volume of the average value signal AUP shown in FIG. 7 is, the larger the width of the pulse width modulation signal PWM shown in FIG. 8 and the higher the light intensity of the light signal are.

In summary, the present disclosure provides the audio processing system and method. The system may receive the audio signal from any signal source, take the absolute value of the audio signal, divide the audio signal into the plurality of sub-frame signals, filter the sub-frame signals, detect the peak values and the average values of the sub-frame signals, and provide them to the audio processer device as control parameters for controlling the audio transceiver device. Therefore, a performance of the audio processing device can be effectively improved via this single simplified circuit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An audio processing system, which is applicable to one or more audio transceiver devices, the audio processing system comprising:
   one or more audio receivers, wherein the audio receiver includes:
      an audio interface connected to the one or more audio transceiver devices and configured to receive an audio signal from the audio transceiver device;
      an absolute value converter unit connected to the audio interface and configured to take an absolute value of the audio signal to output an absolute value audio signal;
      a framing unit connected to the absolute value converter unit and configured to divide the absolute value audio signal into a plurality of sub-frame signals; and a characteristic value detector unit connected to the framing unit and configured to detect one or more characteristic values of the sub-frame signal; and an audio processer device connected to the audio receiver and the audio transceiver device and configured to output an audio processing signal to process the audio signal according to the one or more characteristic values of the sub-frame signals of the audio transceiver device.

2. The audio processing system of claim 1, wherein the characteristic value detector unit includes a peak value detector unit, which is connected to the framing unit and configured to detect a peak value of the sub-frame signal, and the characteristic value includes the peak value.

3. The audio processing system of claim 1, wherein the characteristic value detector unit includes an average value calculator unit, which is connected to the framing unit and configured to calculate an average value of the sub-frame signal, and the characteristic value includes the average value.

4. The audio processing system of claim 1, wherein the characteristic value detector unit includes an envelope filter unit, which is connected to the framing unit and configured to filter the sub-frame signal.

5. The audio processing system of claim 1, wherein the framing unit divides the absolute value audio signal into the plurality of sub-frame signals having variable lengths.

6. The audio processing system of claim 1, further comprising:
a light driver module connected to the audio processer device and one or more light-emitting modules, wherein the audio processer device is configured to output a light controlling signal to control the light driver module to drive the light-emitting module matched with the audio transceiver device to output a light signal according to the one or more characteristic values.

7. The audio processing system of claim 6, wherein the light driver module includes a pulse width modulation signal generator unit, which is connected to the one or more light-emitting modules and configured to output a pulse width modulation signal to control the light-emitting module matched with the audio transceiver device to output a light signal according to the one or more characteristic values;
wherein the light controlling signal includes the pulse width modulation signal.

8. The audio processing system of claim 1, wherein when the audio processer device determines the characteristic value of the sub-frame signal to be smaller than a threshold, and a time during which the characteristic value is smaller than the threshold to be larger than a hold time, the audio processer device outputs the audio processing signal to lower the characteristic value of the audio signal outputted by the audio transceiver device to be equal to a mute threshold within a release time.

9. The audio processing system of claim 1, wherein when the audio processer device determines the characteristic value of the sub-frame signal to be larger than a threshold, the audio processer device outputs the audio processing signal to increase the characteristic value of the audio signal outputted by the audio transceiver device within an attack time.

10. The audio processing system of claim 1, further comprising:
a digital volume controller, a gain of which is adjusted by the audio processer device to eliminate noise of the audio signal when the audio processer device determines that the audio signal has the noise according to the one or more characteristic values of the sub-frame signal.

11. An audio processing method, which is applicable to one or more audio transceiver devices, the audio processing method comprising the following steps:
receiving an audio signal from the audio transceiver device by an audio interface of an audio receiver;
taking an absolute value of the audio signal to output an absolute value audio signal by an absolute value converter unit of the audio receiver;
dividing the absolute value audio signal into a plurality of sub-frame signals by a framing unit of the audio receiver;
detecting one or more characteristic values of the sub-frame signal by a characteristic value detector unit of the audio receiver; and
outputting an audio processing signal to process the audio signal according to the one or more characteristic values of the sub-frame signals by an audio processer device.

12. The audio processing method of claim 11, wherein the step of detecting the one or more characteristic values of the sub-frame signal by the characteristic value detector unit of the audio receiver includes:
detecting a peak value of the sub-frame signal by a peak value detector unit of the characteristic value detector unit.

13. The audio processing method of claim 11, wherein the step of detecting the one or more characteristic values of the sub-frame signal by the characteristic value detector unit of the audio receiver includes:
detecting an average value of the sub-frame signal by an average value calculator unit of the characteristic value detector unit.

14. The audio processing method of claim 11, wherein the step of detecting the one or more characteristic values of the sub-frame signal by the characteristic value detector unit of the audio receiver includes:
filtering the sub-frame signal by an envelope filter unit of the characteristic value detector unit.

15. The audio processing method of claim 11, wherein the step of dividing the absolute value audio signal into the plurality of sub-frame signals by the framing unit includes:
dividing the absolute value audio signal into the plurality of sub-frame signals having variable lengths.

16. The audio processing method of claim 11, further comprising the following step:
outputting, by the audio processer device, a light controlling signal to control a light driver module to drive a light-emitting module to output a light signal according to the one or more characteristic values of the sub-frame signal of the audio transceiver device.

17. The audio processing method of claim 11, further comprising the following step:
outputting a pulse width modulation signal to control a light-emitting module to output a light signal according to the one or more characteristic values by a pulse width modulation signal generator unit.

18. The audio processing method of claim 11, further comprising the following step:
outputting, by the audio processer device, the audio processing signal to lower the characteristic value of the audio signal outputted by the audio transceiver device to be equal to a mute threshold within a release time, when determining the characteristic value of the sub-frame signal to be smaller than a threshold, and a time during which the characteristic value is smaller than the threshold to be larger than a hold time.

19. The audio processing method of claim 11, further comprising the following step:
   outputting, by the audio processer device, the audio processing signal to increase the characteristic value of the audio signal outputted by the audio transceiver device within an attack time, when determining the characteristic value of the sub-frame signal to be larger than a threshold.

20. The audio processing method of claim 11, further comprising the following step:
   adjusting, by the audio processer device, a gain of a digital volume controller to eliminate noise of the audio signal, when determining that the audio signal has the noise according to the one or more characteristic values of the sub-frame signal.

* * * * *